US010297166B2

(12) United States Patent
Ragade et al.

(10) Patent No.: US 10,297,166 B2
(45) Date of Patent: May 21, 2019

(54) LEARNER ENGAGEMENT IN ONLINE DISCUSSIONS

(71) Applicant: LinkedIn Corporation, Sunnyvale, CA (US)

(72) Inventors: Dhananjay R. Ragade, Palo Alto, CA (US); Nishit Tewari, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/418,189

(22) Filed: Jan. 27, 2017

(65) Prior Publication Data

US 2018/0218625 A1 Aug. 2, 2018

(51) Int. Cl.

| G09B 7/02 | (2006.01) |
|---|---|
| H04L 12/58 | (2006.01) |
| G09B 7/00 | (2006.01) |
| H04L 29/08 | (2006.01) |
| G09B 5/00 | (2006.01) |
| H04L 12/18 | (2006.01) |
| G06N 20/00 | (2019.01) |
| G06Q 10/10 | (2012.01) |

(52) U.S. Cl.
CPC ............... *G09B 7/02* (2013.01); *G06N 20/00* (2019.01); *G06Q 10/101* (2013.01); *G09B 5/00* (2013.01); *G09B 7/00* (2013.01); *H04L 12/1831* (2013.01); *H04L 51/16* (2013.01); *H04L 67/22* (2013.01); *H04L 67/306* (2013.01)

(58) Field of Classification Search
None
See application file for complete search history.

(56) References Cited

U.S. PATENT DOCUMENTS

| 2014/0274254 A1* | 9/2014 | Leites | G06F 3/0483 463/11 |
|---|---|---|---|
| 2015/0283455 A1* | 10/2015 | Nova | A63F 9/183 463/9 |
| 2016/0072915 A1* | 3/2016 | Decanne | G06F 17/30247 715/728 |
| 2017/0289596 A1* | 10/2017 | Krasadakis | H04N 21/25883 |
| 2018/0018507 A1* | 1/2018 | Chetlur | G06K 9/00315 |

* cited by examiner

*Primary Examiner* — Jason T Yen
(74) *Attorney, Agent, or Firm* — Park, Vaughan, Fleming & Dowler LLP; Chia-Hsin Suen

(57) ABSTRACT

The disclosed embodiments provide a system that improves learner engagement in online discussions. During operation, the system selects an experience level for use in moderating answers to a question submitted to an online forum. Next, the system matches the experience level to a first subset of users in a set of potential respondents to the question. The system then improves an engagement of the first subset of users with the online forum by generating output that targets the first subset of users with the question, prior to displaying the question to a first remainder of the potential respondents that does not include the first subset of users.

20 Claims, 4 Drawing Sheets

LEARNER ENGAGEMENT IN ONLINE DISCUSSIONS

BACKGROUND

Field

The disclosed embodiments relate to techniques for facilitating discussion in online forums. More specifically, the disclosed embodiments relate to techniques for improving learner engagement in online discussions.

Related Art

Educational technology products and other teaching mechanisms commonly utilize discussions of subject matter to improve a student's mastery of the subject matter. For example, students enrolled in a course may use an online forum for the course to submit questions related to the content of the course, post answers to the questions, and/or engage in discussions related to the questions or answers. By actively participating in the online forum, the students may increase their engagement with the content, understanding of the content, and/or confidence in learning the content.

On the other hand, online discussions can be dominated by a small subset of active users instead of all users who should be participating in the discussions. For example, questions submitted in an online forum for a course may be answered quickly by users who are experts in the course's subject matter and/or users who are generally enthusiastic about participating in online discussions. As a result, users who are less familiar with the subject matter, such as students currently enrolled in the course, may be discouraged from answering the questions or otherwise participating in online discussions related to the subject matter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
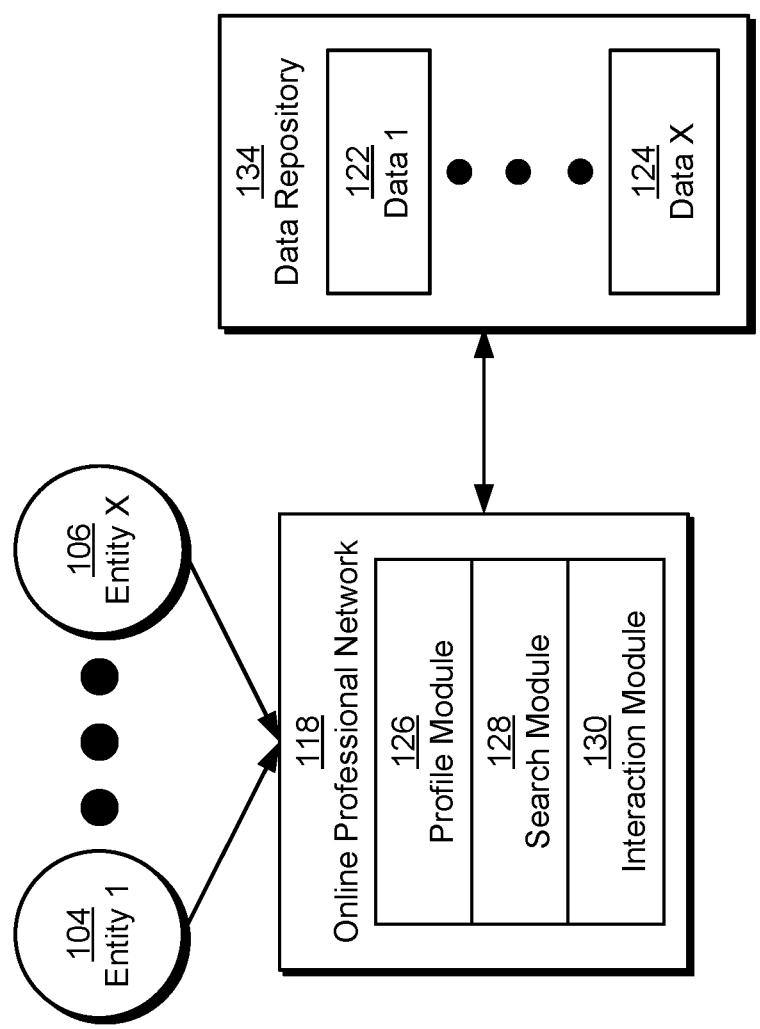
FIG. 1 shows a schematic of a system in accordance with the disclosed embodiments.

The disclosed embodiments provide a method, apparatus, and system for improving learner engagement in online discussions. As shown in FIG. 1, the online discussions may be conducted by members of an online professional network 118, which is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. The profile module may also allow the entities to view the profiles of other entities in the online professional network.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on the online professional network to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, the interaction module may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be tracked and stored in a database, data warehouse, cloud storage, and/or other data-storage mechanism providing data repository 134.

Figure 2:
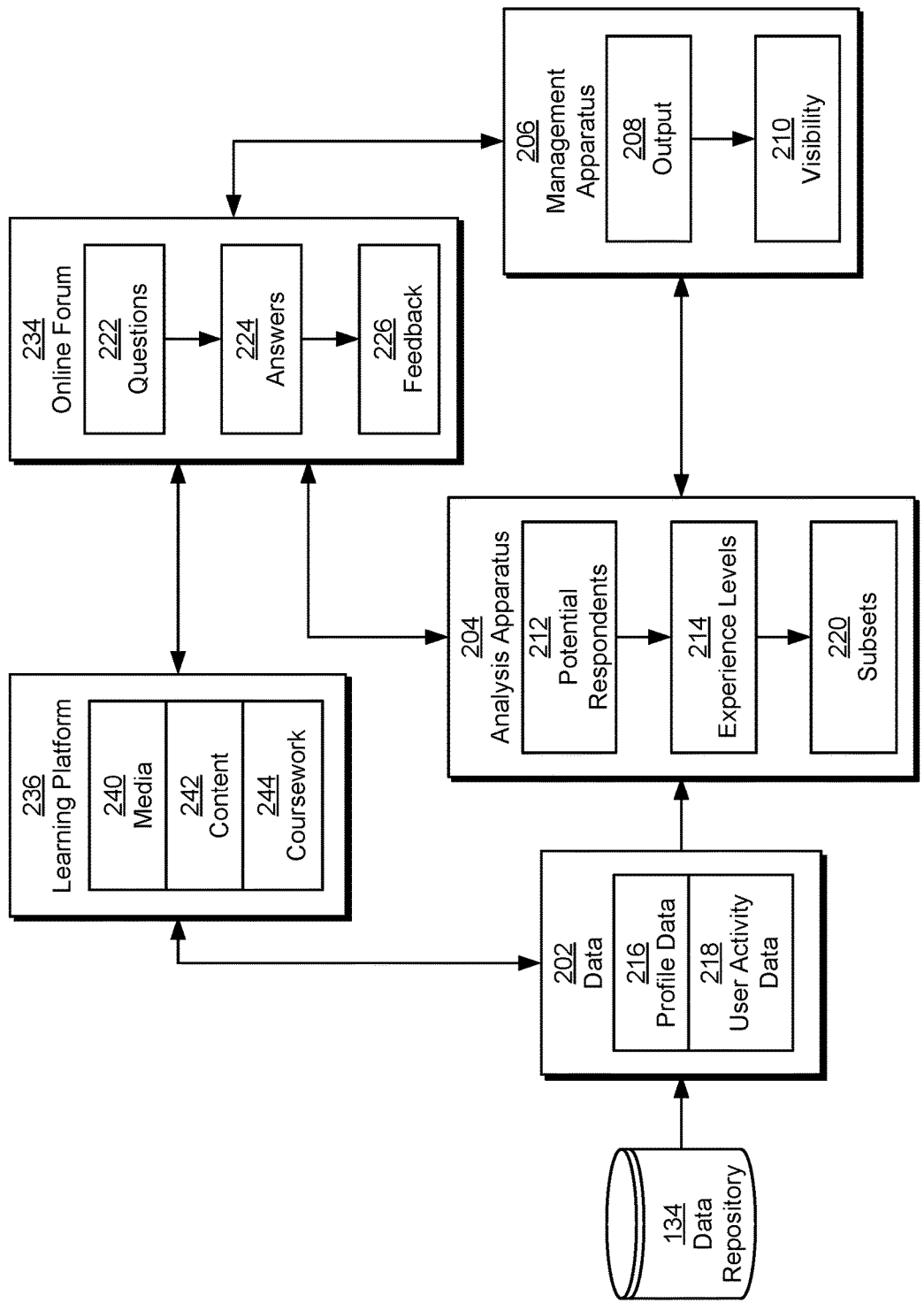
FIG. 2 shows a system for improving engagement in an online discussion in accordance with the disclosed embodiments.

As shown in FIG. 2, data repository 134 and/or another primary data store may be queried for data 202 that includes profile data 216 for members of a social network (e.g., online professional network 118 of FIG. 1), as well as user activity data 218 that tracks the members' activity within and/or outside the social network. Profile data 216 may include data associated with member profiles in the social network. For example, profile data for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. The profile data may also include a set of groups to which the user belongs, the user's contacts and/or connections, and/or other data related to the user's interaction with the social network.

Attributes of the members may be matched to a number of member segments, with each member segment containing a group of members that share one or more common attributes. For example, member segments in the social network may be defined to include members with the same industry, location, profession, skills, and/or language.

Connection information in profile data 216 may additionally be combined into a graph, with nodes in the graph representing entities (e.g., users, schools, companies, locations, etc.) in the social network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

User activity data 218 may include records of member interactions with one another and/or content associated with the social network. For example, the user activity data may be used to track impressions, clicks, likes, dislikes, shares, hides, comments, posts, updates, conversions, and/or other user interaction with content in the social network. The user activity data may also track other types of activity, including connections, messages, and/or interaction with groups or events. Like profile data 216, the user activity data may be used to create a graph, with nodes in the graph representing social network members and/or content and edges between pairs of nodes indicating actions taken by members, such as creating or sharing articles or posts, sending messages, connection requests, joining groups, and/or following other entities.

User activity data 218 may additionally include records of user participation in an online forum 234. The online forum may allow the members to post questions 222 related to various topics, submit answers 224 to the questions, and/or provide feedback 226 (e.g., likes, dislikes, ratings, reviews, comments, etc.) on the answers. In turn, discussions conducted within the online forum may facilitate the exchange of ideas, collaboration, networking, and/or other types of interaction among the members.

In one or more embodiments, online forum 234 is used with a learning platform 236 such as an e-learning product, online education website, massive online open course (MOOC), learning management system, and/or other type of educational technology product. Users of the learning platform may enroll in courses offered by the learning platform and engage with course material through media 240 such as audio or video lectures or tutorials and/or content 242 such as lecture slides, handouts, textbooks, and/or other recommended or required reading. The users may also complete coursework 244 such as homework assignments, projects, essays, quizzes, and/or exams. After a user has completed the coursework and/or received a passing grade for a course, the user may receive a certificate and/or credit for the course.

As a result, online forum 234 may be used by students enrolled in courses offered on learning platform 236 to collaborate on coursework 244 and/or discuss topics and/or subject matter covered in the courses. For example, a student may submit, to the online forum, a question related to a concept covered in a lecture or tutorial and/or a task to be completed in an assignment for a course. The question may be categorized and/or organized under the course, the concept, and/or other topics or subject matter mentioned in or referenced by the question. After the question is posted, other users associated with the course (e.g., current students, previous students, teaching assistants, lecturers, industry experts, etc.) may submit answers 224 to the question. The users may additionally provide feedback 226 related to the answers, such as reviews, ratings, comments, and/or follow-up answers.

However, engagement in online discussions is typically dominated by a small proportion of users. Continuing with the previous example, questions 222 submitted to online forum 234 by current students of courses in learning platform 236 may frequently be answered by previous students of the courses, users who are experts in the subject matter covered by the courses, and/or users who are passionate about responding quickly to posted questions. As a result, other current students of the same courses, who are likely to be less familiar with the subject matter and less motivated to answer the questions, may be deterred from participating in the discussions and engaging with media 240, content 242, and/or coursework 244 for the courses.

In one or more embodiments, the system of FIG. 2 includes functionality to increase user participation in discussions conducted within online forum 234, including discussions related to courses offered through learning platform 236. More specifically, the system may present questions 222 submitted to the online forum to different subsets 220 of users at different times. In turn, users who are less familiar with the subject matter of the questions and/or otherwise less inclined to answer the questions may be given the opportunity to submit answers 224 to the questions before users who are more familiar with the subject matter and/or more active participants in the online forum.

First, an analysis apparatus 204 may identify a set of potential respondents 212 to each question submitted to the online forum. The potential respondents may include all users who are likely, qualified, and/or eligible to answer the question. For example, the potential respondents may include previous participants in the online forum, current and previous students of a course to which the question pertains, users with knowledge of subject matter associated with the question, and/or users who have previously engaged with the subject matter within and/or outside the online forum.

Potential respondents 212 may optionally be restricted to members of an online professional network and/or identified using profile data from the online professional network. For example, learning platform 236 and/or online forum 234 may be offered by or within the online professional network. As a result, users of the learning platform and/or in the online forum may be required to log in using authentication credentials for the users' accounts with the online professional network. In turn, profile data 216 (e.g., titles, skills, summaries, industries, work experience, educational background, etc.) associated with the accounts may be retrieved and used to identify users who have knowledge of and/or interest in the subject matter associated with the question, including users who have not previously participated in the online forum or used the learning platform. In another example, the question may be matched to the relevant experience, skills, and/or background of a member segment of the online professional network for inclusion of the member segment in potential respondents to the question.

Next, analysis apparatus 204 may assign a set of experience levels 214 to potential respondents 212. Each experience level may represent a different amount of experience, knowledge, and/or engagement with the subject matter of the question and/or the course to which the question pertains. For example, analysis apparatus 204 may determine an experience level of each user in the set of potential respondents as a one- or multi-dimensional numeric score that is composed of and/or calculated from multiple components. A higher value for the score may represent a higher experience level for the user, and a lower value for the score may represent a lower experience level for the user.

Continuing with the previous example, the score may include a first component that measures the user's level of participation in discussions on online forum 234 (e.g., based on the user's number of questions 222, answers 224, feedback 226, etc.), with a higher participation level contributing more to the score than a lower participation level. The score may include a second component that measures the user's level of engagement with the course (e.g., based on user sessions, clicks, views, and/or other activity on learning platform 236), with a higher level of engagement contributing more to the score than a lower level of engagement. The score may include a third component that characterizes the user's level of completion of the course (e.g., based on engagement with media 240, content 242, and/or coursework 224), with a higher level of completion contributing more to the score than a lower level of completion. The score may include a fourth component that characterizes the quality of the user's answers in the online forum (e.g., as an average rating and/or average number of likes or dislikes), with a higher quality contributing more to the score than a lower quality. The score may include a fifth component that identifies the user as a current student or previous student of the course, with a previous student contributing more to the score than a current student. If the user is neither a current nor a previous student of the course, the fifth component may be omitted from the score. Finally, the score may include a sixth component that uses profile data from the online professional network to adjust the score so that users who are similar (e.g., have similar work experience, educational backgrounds, skills, and/or positions) or should otherwise be encouraged to interact are more likely to be placed in the same experience level.

After the score is calculated, analysis apparatus 204 may bucketize the score and/or different components of the score into ranges of values representing various experience levels 214 with the course, subject matter of the question, and/or online forum 234. The analysis apparatus may then group potential respondents 212 into multiple subsets 220 of users, with each subset assigned to a different experience level.

Analysis apparatus 204 may also select an experience level for use in moderating answers 224 to each question submitted to online forum 234. The selected experience level may be obtained as one or more components used to determine the experience level of the user who submitted the question, such as components described in the previous example. The experience level may also be adjusted based on the topics or subject matter covered by the question and/or the difficulty of the question. For example, the user's experience level may be used to moderate answers to the user's question when the question directly references (e.g., links to or is posted under) content in the course and/or is deemed highly relevant to the course. Conversely, the experience level used to moderate answers to the question may be selected to be different from (e.g., higher than) the user's experience level when the question is directed to topics that are less relevant to the course.

Consequently, the experience level selected for the question may identify a subset of potential respondents 212 that would benefit from answering the question. For example, the experience level may identify current students of the course to which the question pertains, who have completed enough of the course to be exposed to the subject matter in the question, and who are less active participants in the online forum than other current or previous students of the course. On the other hand, the experience level may be increased when answering the question is expected to require additional knowledge or expertise that is outside the scope of the course.

In turn, a management apparatus 206 may moderate answers 224 to the question by generating output 208 that targets a subset of potential respondents 212 assigned to the selected experience level with the question, prior to displaying the question to the remaining potential respondents. For example, the management apparatus may transmit a notification, email, message, and/or other communication containing the question and/or a prompt to answer the question to the subset of users according to the users' notification preferences with online forum 234, learning platform 236, and/or the online professional network. The management apparatus may also, or instead, adjust a visibility 210 of the question so that the question is displayed to the subset of users within the online forum and/or with content 242 for the corresponding course in the learning platform. To further encourage the subset of users to submit answers 224 to the question, the management apparatus may omit notifications related to the question and/or displaying the question to the remaining potential respondents for a pre-specified period, such as a number of minutes or hours after the question is submitted to the online forum and/or output 208 is generated.

After the first subset of users has had the opportunity to answer the question (e.g., after the pre-specified period has passed after generation of output 208), management apparatus 206 may generate additional output 208 that targets additional subsets of users in potential respondents 212 with the question. For example, the management apparatus may use the additional output to target a new subset of potential respondents with a higher experience level than the first subset, such as users who have completed the course, more actively participate in online forum 234, and/or provide higher quality answers to questions 222 in the online forum. The management apparatus may also modify the content of the additional output to reflect the type of participation desired of the new subset. Continuing with the previous example, the management apparatus may prompt the users to answer the question and/or provide feedback 226 (e.g., comments, likes, dislikes, ratings, reviews, etc.) on answers submitted by the first subset of users. In turn, the answers and/or feedback may promote understanding and/or encourage additional discussion of the subject matter in the question by both subsets of users.

Management apparatus 206 may continue generating output 208 and/or modifying visibility 210 for additional subsets 220 of potential respondents 212 at pre-specified intervals. Each new subset of users targeted by the management apparatus may have a higher experience level than previous subsets of users who have already been exposed to the question. For example, the management apparatus may release the question to users with increasing amounts of knowledge or experience until subject matter experts, instructors, and/or teaching assistants are included in the discussion. Thus, the most recently targeted subset of users may have the perspective and/or enthusiasm required to submit additional answers 224 and/or feedback 226 related to the question, which may drive added discussion in online forum 234 and/or increase the depth of the discussion. Consequently, the system of FIG. 2 may automate the moderation of online discussions in a way that encourages participation by all levels of users and facilitates engagement and understanding of content in the discussions for the users.

Those skilled in the art will appreciate that the system of FIG. 2 may be implemented in a variety of ways. In particular, an "online" instance of analysis apparatus 204 may perform real-time or near-real-time processing of profile data and/or user activity data 218 to identify potential respondents 212, experience levels 214, and subsets 220 of users using the most recent interactions with learning platform 236 and/or online forum 234. An "offline" instance of analysis apparatus 204 may also, or instead, perform batch or offline processing of the data to identify topics in and/or ascertain the difficulty of questions 222; identify trends, correlations, and/or relationships among profile data 216, participation in the online forum, and/or understanding of content 242 in learning platform 236; and/or perform other types of inference or computationally intensive analysis.

Similarly, data 202 in data repository 134 may be obtained from a number of data sources. For example, the data repository may include data from a cloud-based data source such as a Hadoop Distributed File System (HDFS) that provides regular (e.g., hourly) updates to data associated with connections, people searches, recruiting activity, clicks, user sessions, engagement with online forum 234, and/or other user activity with the online forum and/or learning platform 236. The data repository may also include data from an offline data source such as a Structured Query Language (SQL) database, which refreshes at a lower rate (e.g., daily) and provides data associated with profile content (e.g., profile pictures, summaries, education and work history), profile completeness, and/or metrics or scores associated with profile data 216 and/or user activity data 218. The data repository may further include data from an online database and/or cache that is refreshed in real-time or near-real-time from an event stream containing records of clicks, views, searches, and/or other user activity with other components of the system.

Moreover, analysis apparatus 204, management apparatus 206, data repository 134, online forum 234, and/or learning platform 236 may be provided by a single physical machine, multiple computer systems, one or more virtual machines, a grid, one or more databases, one or more filesystems, and/or a cloud computing system. The analysis apparatus and management apparatus may additionally be implemented together and/or separately by one or more hardware and/or software components and/or layers.

Along the same lines, online forum 234 and/or learning platform 236 may exist within and/or separately from a social network. As a result, users may access the learning platform and/or online forum through the social network, use authentication credentials with the social network to access the learning platform and/or online forum on a different website or application, and/or form a social network within the learning platform and/or online forum.

Figure 3:
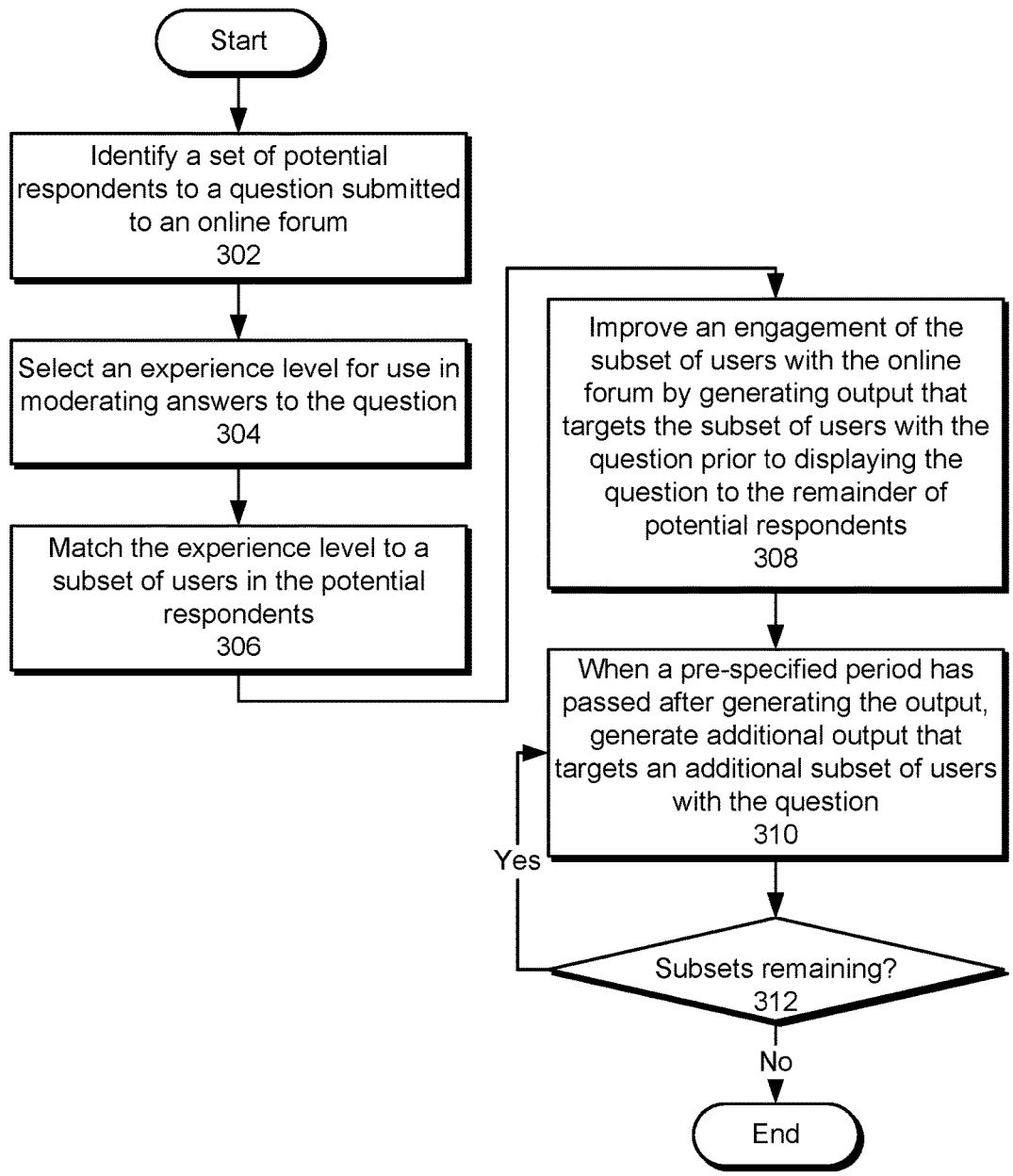
FIG. 3 shows a flowchart illustrating a process of improving engagement in an online discussion in accordance with the disclosed embodiments.

FIG. 3 shows a flowchart illustrating a process of improving engagement in an online discussion in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of potential respondents to a question submitted to an online forum is identified (operation 302). For example, the question may be submitted under a topic or category related to a course associated with the online forum. Alternatively, the topic or category may be extracted from the content of the question and/or one or more links or references in the question. The potential respondents may then be identified based on previous participation in the online forum, enrollment in the course, knowledge of subject matter associated with the topic or category, engagement with the subject matter in or outside the online forum, membership in an online professional network, and/or profile data from the online professional network.

Next, an experience level is selected for use in moderating answers to the question (operation 304). For example, the experience level may be associated with a level of participation in the online forum, a level of engagement with a course associated with the online forum, a level of completion of the course, a quality of answers provided in the online forum, an enrollment in the course, and/or profile data from an online professional network. In addition, the experience level may be selected to reflect attributes of the user who submitted the question, the difficulty of the question, and/or topics or subject matter in the question.

The experience level is also matched to a subset of users in the potential respondents (operation 306). For example, each potential respondent of the question may be assigned a numeric and/or bucketized experience level, and the potential respondents may be grouped by experience level. A group of potential respondents with experience levels that match and/or fall below the selected experience level for the question may then be identified.

An engagement of the subset of users with the online forum is then improved by generating output that targets the subset of users with the question prior to displaying the question to the remainder of potential respondents (operation 308). For example, the output may include a notification, email, message, and/or other communication that includes the question and/or prompts the subset of users to answer the question. The output may also, or instead, include displaying the question to the subset of users within the online forum and/or with media or content for the course in a learning platform associated with the online forum. Because the subset of users is notified of the question before other potential respondents, users in the subset may be given the opportunity to respond to the question before potential respondents who are more familiar with topics or subject matter in the question and/or who participate more actively in the online forum.

When a pre-specified period has passed after generating the output, additional output that targets an additional subset of users with the question is generated (operation 310). For example, the additional subset of users may receive the additional output after a number of minutes or hours have passed since the initial subset of users was targeted in operation 308. The additional subset of users may also have a higher experience level than the initial subset of users. As a result, the additional subset may be prompted to provide additional answers to the question and/or provide feedback on existing answers submitted by the initially targeted subset.

Operation 310 may be repeated for remaining subsets of users (operation 312) in the potential respondents until all potential respondents are able to view and respond to the question. For example, subsets of users with increasingly high experience levels (e.g., current students, previous students, non-students with subject matter experience, subject matter experts, instructors, etc.) may be targeted with the question at periodic and/or varying intervals to drive discussion of the question and/or increase the depth of the discussion over time. In turn, users at all experience levels may be given the opportunity to participate in the discussion and acquire new knowledge or perspective from the discussion.

Figure 4:
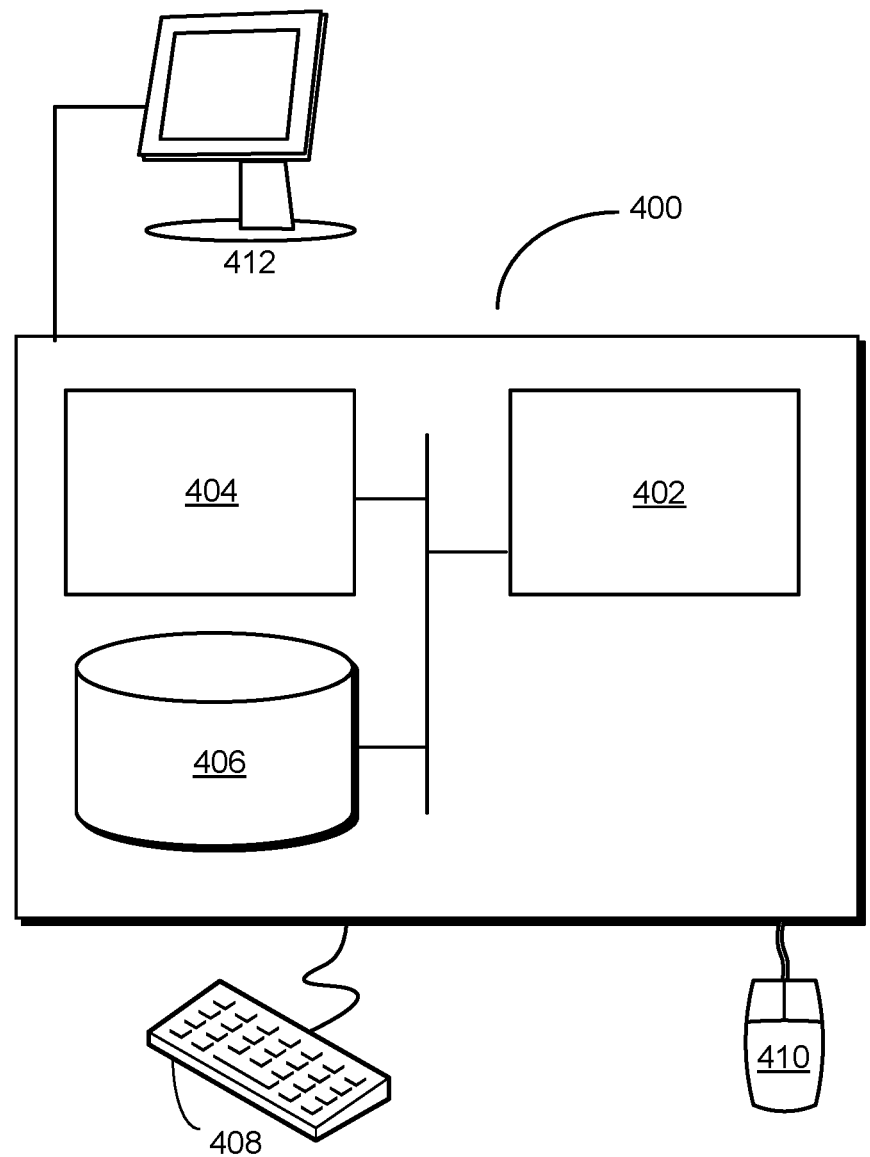
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for improving learner engagement in online discussions. The system may include an analysis apparatus and a management apparatus, one or both of which may alternatively be termed or implemented as a module, mechanism, or other type of system component. The analysis apparatus may select an experience level for use in moderating answers to a question submitted to an online forum. Next, the analysis apparatus may match the experience level to a first subset of users in a set of potential respondents to the question. The management apparatus may then improve an engagement of the first subset of users with the online forum by generating output that targets the first subset of users with the question, prior to displaying the question to a first remainder of the potential respondents that does not include the first subset of users.

In addition, one or more components of computer system 400 may be remotely located and connected to the other components over a network. Portions of the present embodiments (e.g., analysis apparatus, management apparatus, data repository, online forum, learning platform, etc.) may also be located on different nodes of a distributed system that implements the embodiments. For example, the present embodiments may be implemented using a cloud computing system that automates the moderation of online discussions for a set of remote users associated with a course in a learning platform.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   receiving a question submitted to an online forum, from an electronic device operated by a user of the online forum;
   selecting, by one or more computer systems, an experience level associated with the question;
   for each user in a first subset of users of the online forum, calculating a numeric score representing an experience level of the user from multiple components;
   matching, by the one or more computer systems, the experience level to the first subset of users in a set of potential respondents to the question; and
   improving an engagement of the first subset of users with the online forum by causing the question to be transmitted to the first subset of users by the one or more computer systems prior to transmitting the question to a first remainder of the potential respondents that does not include the first subset of users.

2. The method of claim 1, wherein the experience level of a user is based on at least one of:
   a level of participation in the online forum;
   a level of engagement with a course associated with the online forum;
   a level of completion of the course;
   a quality of answers provided in the online forum;
   an enrollment in the course; and
   profile data from an online professional network.

3. The method of claim 1, wherein the experience level associated with the question is selected based on at least one of:
   an attribute of the user submitting the question; and
   a topic associated with the question.

4. The method of claim 3, wherein the attribute of the user comprises at least one of:
   the experience level; and
   profile data from an online professional network.

5. The method of claim 3, wherein the topic is related to a course associated with the online forum.

6. The method of claim 1, further comprising:
   identifying the set of potential respondents to the question prior to matching the question to the experience level.

7. The method of claim 6, wherein the set of potential respondents is identified using at least one of:
   previous participation in the online forum;

enrollment in a course associated with the online forum;
knowledge of subject matter associated with the question;
engagement with the subject matter;
membership in an online professional network; and
profile data from the online professional network.

8. The method of claim 1, further comprising:
when a pre-specified period has passed after generating the output that targets the first subset of users with the question, generating additional output that targets a second subset of users in the set of potential respondents with the question prior to displaying the question to a second remainder of the potential respondents that does not include the first or second subsets of users.

9. The method of claim 8, wherein the additional output that targets the second subset of users with the question comprises:
a prompt to answer the question; and
an additional prompt to provide feedback on submitted answers to the question.

10. The method of claim 8, wherein the second subset of users has a higher experience level than the first subset of users.

11. The method of claim 1, wherein the output that targets the first subset of users with the question comprises at least one of:
a notification;
an email;
a message;
displaying the question to the first subset of users within the online forum; and
displaying the question to the first subset of users with content for a course associated with the online forum.

12. An apparatus, comprising:
one or more processors; and memory storing instructions that, when executed by the one or more processors, cause the apparatus to:
receive a question submitted to an online forum, from an electronic device operated by a user of the online forum; select an experience level associated with the question;
for each user in a first subset of users of the online forum, calculate a numeric score representing an experience level of the user from multiple components;
match the experience level to the first subset of users in a set of potential respondents to the question; and
improve an engagement of the first subset of users with the online forum by causing the question to be transmitted to the first subset of users prior to transmitting the question to a first remainder of the potential respondents that does not include the first subset of users.

13. The apparatus of claim 12, wherein the experience level of a user is based on at least one of:
a level of participation in the online forum;
a level of engagement with a course associated with the online forum;
a level of completion of the course;
a quality of answers provided in the online forum;
an enrollment in the course; and
profile data from an online professional network.

14. The apparatus of claim 12, wherein the experience level associated with the question is selected based on at least one of:
an attribute of the user submitting the question; and
a topic associated with the question.

15. The apparatus of claim 12, wherein the memory further stores instructions that, when executed by the one or more processors, cause the apparatus to:
identify the set of potential respondents to the question prior to matching the question to the experience level.

16. The apparatus of claim 15, wherein the set of potential respondents is identified using at least one of:
previous participation in the online forum;
enrollment in a course associated with the online forum;
knowledge of subject matter associated with the question;
engagement with the subject matter;
membership in an online professional network; and
profile data from the online professional network.

17. The apparatus of claim 12, wherein the memory further stores instructions that, when executed by the one or more processors, cause the apparatus to:
when a pre-specified period has passed after generating the output that targets the first subset of users with the question, generate additional output that targets a second subset of users in the set of potential respondents with the question, prior to displaying the question to a second remainder of the potential respondents that does not include the first or second subsets of users.

18. The apparatus of claim 17, wherein the second subset of users has a higher experience level than the first subset of users.

19. A system, comprising:
one or more processors; an analysis module comprising a non-transitory computer-readable medium storing instructions that, when executed by the one or more processors, cause the system to:
receive a question submitted to an online forum, from an electronic device operated by a user of the online forum;
select an experience level associated with the question; for each user in a first subset of users of the online forum, calculate a numeric score representing an experience level of the user from multiple components; and
match the experience level to the first subset of users in a set of potential respondents to the question; and
a management module comprising a non-transitory computer-readable medium storing instructions that, when executed by the one or more processors, cause the system to improve an engagement of the first subset of users with the online forum by causing the question to be transmitted to the first subset of users prior to transmitting the question to a first remainder of the potential respondents that does not include the first subset of users.

20. The system of claim 19, wherein the experience level of a user is based on at least one of:
a level of participation in the online forum;
a level of engagement with a course associated with the online forum;
a level of completion of the course;
a quality of answers provided in the online forum;
an enrollment in the course; and
profile data from an online professional network.

* * * * *